United States Patent [19]

Urano et al.

[11] 4,191,463
[45] Mar. 4, 1980

[54] COUNTER DEVICE FOR MULTIPLE EXPOSURE IN A CAMERA

[75] Inventors: Fumio Urano, Omiya; Keisuke Haraguchi, Ranzan; Akihiro Arai, Urawa, all of Japan

[73] Assignee: Asahi Kogaku Kogyo Kaisha, Tokyo, Japan

[21] Appl. No.: 916,386

[22] Filed: Jun. 16, 1978

[30] Foreign Application Priority Data

Jun. 20, 1977 [JP] Japan .............................. 52-80759[U]

[51] Int. Cl.² ............................................ G03B 17/36
[52] U.S. Cl. ...................................... 354/217; 354/209
[58] Field of Search ............................... 354/209, 217

[56] References Cited

U.S. PATENT DOCUMENTS 3,829,876  8/1974  Uno et al. .......................... 354/217

Primary Examiner—Monroe H. Hayes
Attorney, Agent, or Firm—Sughrue, Rothwell, Mion, Zinn and Macpeak

[57] ABSTRACT

A counting device for counting the number of exposures for a given frame of film in a multiple exposure camera is operable by the winding mechanism of the camera after the film winding spools have been disengaged therefrom. A means is provided for enabling the counter while simultaneously disengaging and locking the film spools and both mechanical and electrical exposures counters are disclosed.

5 Claims, 5 Drawing Figures

COUNTER DEVICE FOR MULTIPLE EXPOSURE IN A CAMERA

BACKGROUND OF THE INVENTION

This invention relates to a counter device for multiple exposures in a camera having a multiple exposure function.

A counter for counting the number of frames of a film is essential for a camera and, therefore, almost all cameras are provided with such frame counters. Recently, cameras having a multiple exposure function have been proposed for achieving high-grade photographing. However, in such conventional cameras, only a device for preventing the counter from being advanced during the multiple exposure is provided; that is, in none of the conventional cameras is a display means for displaying the number of times of exposure in one frame provided. Nevertheless, the conventional cameras are not so inconvenient in the case where the winding lever is manually operated. On the other hand, recently, cameras having a motor-driven winding devices have been proposed. With these cameras, it is possible to successively carry out photographing operations at a rate of plural frames per second, and the motion of a moving object can also be photographed in one frame by multiple exposure. However, if the number of times of exposure is not indicated, it will lead to uneconomical used of time and film, or limit the photographer's intentions.

SUMMARY OF THE INVENTION

Accordingly, an object of this invention is to eliminate the difficulties accompanying a conventional camera by providing a counter which will advance only during multiple exposure, without significantly increasing the manufacturing cost and the number of steps in the camera assembling process, to thereby permit higher-grade photographing with reduced effort.

Briefly, this is achieved by providing a means for selectively disengaging the film winding spools from the camera winding mechanism and simultaneously coupling an exposure counter to the winding mechanism so that each time the winding mechanism is operated, either manually or automatically the exposure counter is advanced without the film. The exposure counter may be a mechanical counter or an electrical one, e.g. a seven-segment LED display.

DETAILED DESCRIPTION OF THE INVENTION

Figure 1:
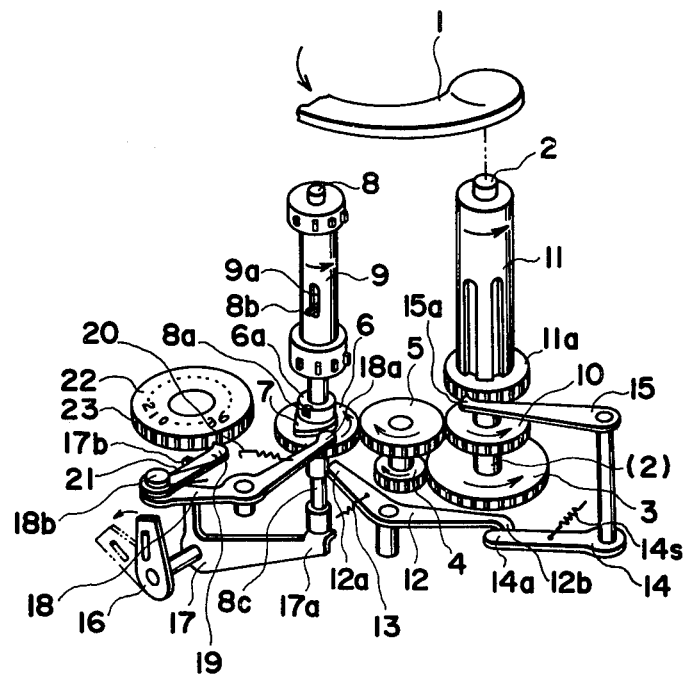
FIG. 1 is an explanatory diagram showing a mechanism of one embodiment of this invention.

This invention will now be described with reference to its preferred embodiment. FIG. 1 shows the mechanism of the counter device according to the present invention, in which reference numeral 1 designates a winding lever provided outside the camera. The winding lever 1 is coupled to a shaft 2 through a so-called one-way clutch which is engaged if turned counterlockwise as viewed in FIG. 1, but it is disengaged if turned clockwise; however, the clutch mechanism is not shown because it is well known in the art. A first gear 3 is affixed to the shaft 2. The gear 3 is engaged with a sprocket gear 6 through idle gears 4 and 5 on one hand, and is engaged with a spool gear 10 on the other hand. A counter cam 7 is fixedly secured to the gear 6. Reference number 8 designates a sprocket shaft, and a pin 8a embedded therein is inserted into a groove 6a formed in the gear 6. A pin 8a embedded in the shaft 8 is inserted in a groove 9a elongated in the thrust direction of a sprocket 9. In other words, the shaft 8 is integral with the sprocket 9 in the rotational direction, but is freely movable in the thrust direction. A spool gear 10 and a spool 11 are illustrated roughly as they are well known in the art. The spool gear 10 is coupled to the spool 11 through friction.

In the mechanism thus constructed, if a manual driving force is applied to the winding lever 1 in the direction of the arrow, or counterclockwise, then film winding means 8, 9 and 11 are turned in the directions of the arrows, respectively by winding operating transmitting means 2, 3, 4, 5, 6 and 10, as a result of which the film is wound. Reference numeral 12 designates a set member. One end of the set member 12 is abutted against the sprocket shaft 8 by the action of a spring 13, while the end 14a of a transmitting member 14 is abutted against the other end of the set member, a bent portion 12b, by the elastic force of a spring 14s. A spool locking member 15 is integral with the transmitting member 14, and a pawl 15a provided at the end of the spool locking member 15 is held about to engage the teeth of a flange 11a of the spool 11. A multiple exposure operating member 16 is integral with a switching member 17 at least in the rotational direction. A bent portion 17a formed at one end of the switching member 17 is extended below the sprocket shaft 8, and it can cause the sprocket shaft 8 to move upward by operating the multiple exposure operating member counterclockwise as viewed in the figure, or in the direction of the arrow. Reference numeral 18 designates a counter interconnecting member, the one end 18a of which is abutted against the periphery of the counter cam 7 with the aid of a spring 20. A counter driving member 19 is supported on a shaft 18b fixedly provided at the other end of the member 18. The two members 18 and 19 are elastically energized by a spring 21 so that they are forcibly spaced apart from each other. The action of the spring 20 is much greater than that of the spring 21. A counter 22 is provided integral with its wheel 23. Under this condition (in FIG. 1), if an operating force is applied to the operating member 16 in the direction of the arrow until it is moved to its position indicated by the two-dot chain line, then the sprocket shaft 8, being lifted by the bent portion 17a of the switching member 17, is displaced. In this operation, the pin 8a is disengaged from the elongated groove 6a of the sprocket gear 6, as a result of which the engagement of the shaft 8 and the gear 6 is released. At the same time, one end portion 12a of the aforementioned set member 12 is inserted into a slot 8c of the sprocket shaft 8, while the other end thereof is drawn apart from the transmitting member 14. As a result, the transmitting member 14 and the spool locking member 15 are turned clockwise by the spring 4s, and the pawl 15a formed at the end of the spool locking member 15 engages with the teeth 11a of the spool 11. Even if, under this condition, a force is exerted on the winding lever 1 so that is is turned counterclockwise, the film winding means 8, 9 and 11 are not turned although the transmitting means 2, 3, 4, 5, 6 and 10 are turned. Thus, multiple exposure can be effected by performing exposure in a well known manner, although not shown.

The above-described winding operation transmitting means, film winding means and multiple exposure function are well known in the art, but by providing a means for disengaging the winding operation transmitting means from the film winding means during the multiple exposure function the former may be used to advance an exposure counter. The part 12a of the set member 12 is inserted into the slot 8c of the sprocket shaft 8 to prevent the shaft 8 from being restored downwards by a spring (not shown), and the release of the set member 12 is accomplished for instance, by a release operation at the end of the winding operation in a known manner (not shown).

The switching operation of the counter driving member 19 effected by the end 17b of the switching member 17 when the multiple exposure operating member 16 is at its position indicated by the two-dot chain line in the figure will now be described with reference to FIGS. 2 and 3.

Figure 2:
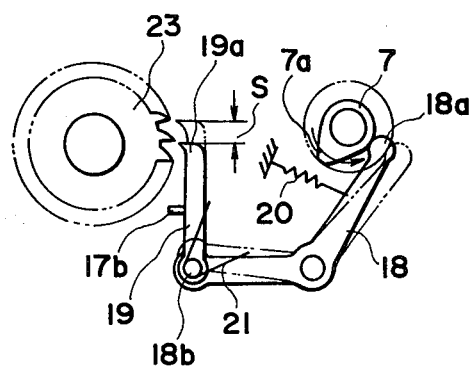
FIG. 2 is a diagram for a description of the operation of the embodiment in normal photographing.

FIG. 2 is an explanatory diagram showing the operating member 16 and its associated elements observed when the operating member 16 is at its inoperable position. The counter cam 7 makes one revolution per winding operation, during which the protrusion 7a causes the end 18a of the counter intercounting member 18 to move to a position indicated by the two-dot chain line in FIG. 2, while the counter driving member 19 is also moved to its position indicated by the two-dot chain line. However, as the counter driving member 19 is disengaged from the counter wheel 23 by means of the end 17b of the switching member 17, the counter 22 is not advanced. On the other hand, when the operating member 16 is at the operating position, the other end 17a of the switching member is moved left in FIG. 2, and the end 19a of the counter driving member 19 is engaged with the counter wheel 23 by the action of the spring 21 as shown in FIG. 3. If, under this condition, the counter cam 7 makes one revolution in the direction of the arrow, then the counter interconnecting member 18 is moved to the position indicated by the two-dot chain line, while the counter driving member 19 is moved as much as s, as a result of which the counter wheel 23 is turned as much as one tooth, and the counter 22 (not shown in FIG. 3) is advanced as much as one frame as indicated. The counter wheel 23 thus turned is held there by a stop member (not shown). The driving member 19 and its stop member are moved right (as viewed in FIG. 3) by the other end 17b of the switching member 17 when the operating member 16 is reset from the operable position to the inoperable position, as a result of which the driving member 19 and its stop member are disengaged from the counter wheel 23. The counter wheel 23 is restored and reset by a spring (not shown). Such a mechanism is not shown because it is similar to that of a conventional counter for counting the number of frames of a film. The operable and inoperable positions of the multiple exposure operating member 16 are determined by a strong click means or a locking means, but the latter is not shown because it is not directly related to this invention.

Figure 4:
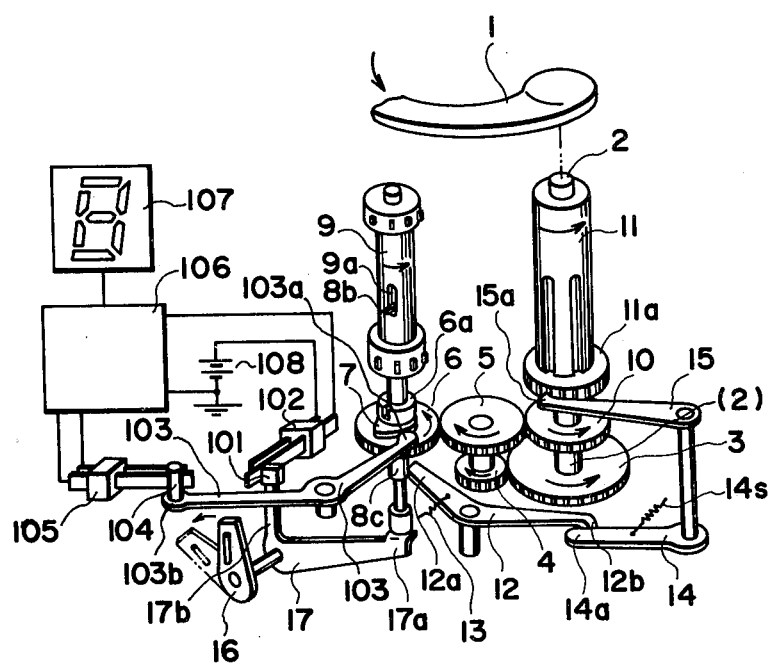
FIG. 4 is an explanatory diagram showing an arrangement of another embodiment of the invention in which a display means is operated electrically.
Figure 3:
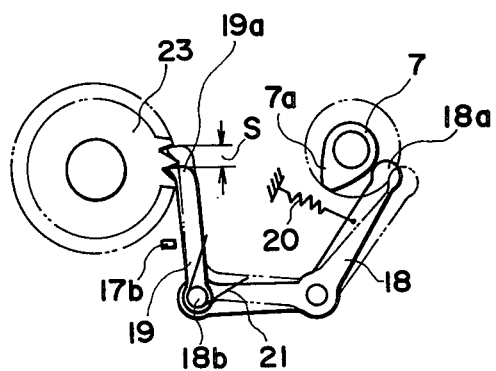
FIG. 3 is a diagram for a description of the operation of the embodiment in multiple exposure photographing.
Figure 5:
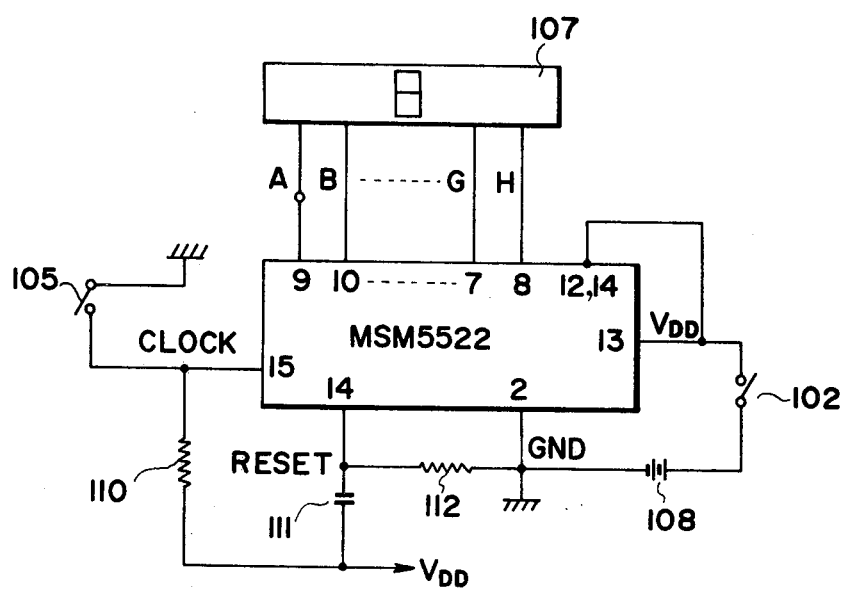
FIG. 5 is a circuit diagram of a counter circuit in FIG. 4.

In FIGS. 1 through 3, the counter means is operated mechanically. However, a counter means shown in FIG. 4 is operated electrically, for instance, by a light emission diode. In this example, an insulating member 101 is fixedly secured to the other end 17b of the switching member 17 to operate a power switch 102. One end 103a of an associating member 103 is abutted against the counter cam 7, while an insulating collar 104 is provided on the other end 103b of the member 103 to operate a clock switch 105. A counter circuit 106 is connected between the positive and negative terminals of a power supply 108 through the power switch 102 connected to the positive terminal of the power supply 108, the negative terminal of which is grounded. A display circuit 107 is connected to the counter circuit. A concrete example of the counter circuit 106 is shown in FIG. 5, in which a CMOS IC, MSM5522 (Oki) is employed as the counter circuit; however, it is apparent that the counter circuit is not limited thereto. When the multiple exposure operating member 16 is at the inoperable position, the power switch 102 is not closed by the switching member 17. Accordingly, the counter circuit 106 and the display circuit 107 are not energized, and the LED is not operated (or it does not emit light). On the other hand, when the multiple exposure operating member 16 is at the operable position, the switch 102 is closed. As a result, the level at the reset terminal is maintained at a high level for a period of time corresponding to the time constant determined by a capacitor 111 and a resistor 112, and the display circuit 107 displays "0" with the aid of a decoder in the circuit 106. Thereafter, when the clock switch 105 is turned on, the level at the clock terminal is switched from the high level to the low level, and the display circuit displays "1." As the counter cam 7 makes one revolution, the member 103 carries out reciprocation clockwise and counterclockwise. Accordingly, the clock switch 105 is operated "open"-"close"-"open" by the insulating collar 104, and the resultant signals are applied, as clock pulse signals, to the counter circuit 106 to drive the display circuit 107 through the decoder. As a result, the display is changed from "1" to "2." In this example, the seven segments of an LED display known in the art are employed for displaying digits; however, the display may also be achieved by a liquid crystal displaying means.

When the operating member 16 is at its operable position, it is possible to perform multiple exposure, and whenever the winding operation driving means is operated, the counter advances one step, to thereby display a numerical value indicating the number of times of exposure in one frame.

As is apparent from the above description, according to this invention, multiple exposure can be conducted by moving the multiple exposure operating member to its multiple exposure position, and the number of times of exposure effected in one frame is displayed to the photographer by placing the count display means in drive state. This effect becomes more significant especially when the winding operation driving means is successively operated by an electric motor as was described before (the automatic winding mechanism is not shown because it is well known in the art).

In many cases where a motor-driven winding means is formed into one unit which can be detachably mounted on the camera body, it would be simple to provide in the unit the counter cam 7, the multiple exposure operating member 16, the switching member 17, the counter interconnecting member 18, the counter driving member 19, the counter 22, and the counter wheel 23 shown in FIG. 1, or the counter cam 7, the insulating member 101, and so forth shown in FIG. 4 and yet to have the same effect as that described above. Furthermore, it would be simple to replace the multiple exposure operating member 16 with another operating member such as the on-off operating member of a motor-driven winding means.

In conclusion, in this invention, in the multiple exposure operation the number of times of exposure is displayed to the photographer, to thereby promote economical use of both time and film, and to allow the photographer to readily accomplish high-grade photographing.

What is claimed is:

1. A camera of the type having a multiple exposure function, film winding means on which the camera film is wound and operating means for transmitting motion through a winding operation transmitting means to said film winding means to thereby cause said film to be wound, wherein the improvement comprises:
    a counter device for displaying the number of exposures taken per frame of film;
    a counter advance means engageable with said counter device and said winding operation transmitting means for advancing said counter device in response to movement of said operating means; and
    switch means movable by the camera operator between a first position for disabling said counter advance means and a second position for enabling said counter advance means while simultaneously preventing movement of said film winding means by said operating means so that when said switch means is in said second position the counter device may be advanced by said operating means through said winding operation transmitting means to count the number of exposures without winding said film.

2. A camera according to claim 1, wherein said winding means frictionally engages said winding operation transmitting means and said switch means includes a means for locking said winding means against further movement.

3. A camera according to claims 1 or 2, wherein said winding operation transmitting means includes a rotatable member splined to said film winding means for synchronous rotation therewith and said switch means includes a means for causing relative axial movement between said rotatable member and said film winding means in order to disengage said spline.

4. A camera as claimed in claims 1 or 2, wherein said counter device is an electrical display and said switch means connects operating power to said display when in said second position.

5. A camera according to claim 1, wherein said operating means and said counter device are incorporated in a single unit which may be detachably mounted on the camera.

* * * * *